S. A. DENNIS.
FAUCET.
APPLICATION FILED NOV. 14, 1906.
971,361.
Patented Sept. 27, 1910.
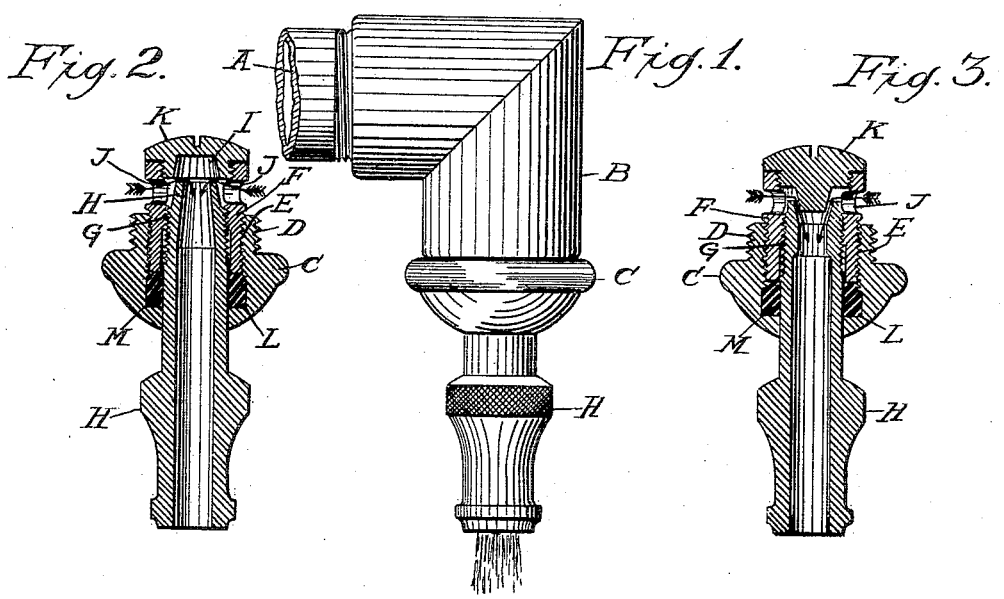
WITNESSES:
INVENTOR.
SAMUEL A. DENNIS
BY
ATTORNEY.

UNITED STATES PATENT OFFICE.

SAMUEL A. DENNIS, OF LOS ANGELES, CALIFORNIA.

FAUCET.

971,361.  Specification of Letters Patent.  Patented Sept. 27, 1910.

Application filed November 14, 1906. Serial No. 343,936.

*To all whom it may concern:*

Be it known that I, SAMUEL A. DENNIS, of Los Angeles, California, have invented a new and useful Faucet, of which the following is a specification.

My invention relates to faucets and consists of the novel features herein shown, described and claimed.

In the drawings: Figure 1 is a view in elevation showing my improved faucet in position for use. Fig. 2 is a sectional elevation on a plane with Fig. 1, of the faucet, the supply pipe being omitted. Fig. 3 is a view analogous to Fig. 2 and showing a modified form of valve and valve seat.

Referring to the drawings in detail, the plug C has an external screw thread D and an internal screw thread E, and a packing chamber L. The screw thread D is adapted to fit into the end of a pipe such as the elbow B, for attaching the faucet in position for use. The stuffing box gland F is externally screw threaded to fit the screw thread E and has an internal screw thread G to receive the screw threaded inner end of the nozzle H, the plug C having a central opening to receive said nozzle. A plug K is screwed into the inner end of the stuffing box gland F and has a conical valve seat I in position to receive the tapered inner end of the nozzle H. Openings J are formed transversely through the stuffing gland F just inside of the inner end of the plug K, so that when the faucet H is screwed outwardly the liquid may pass inwardly through the openings and out through the faucet, and so that when the faucet is screwed inwardly against the seat the passage is cut off. It is obvious that the flow may be regulated by screwing the faucet in and out more or less.

Packing M is placed in the packing chamber L around the faucet and the packing is tightened or adjusted by screwing the gland F in or out.

In the modification shown in Fig. 3 the valve seat formed upon the plug K is a projecting cone adapted to fit in the inner end of the nozzle.

I claim:

A faucet comprising a plug having an external screw thread and an internal packing chamber and a bore to receive a nozzle, a stuffing box gland screw seated in the packing chamber and having transverse openings, a plug screw seated in the inner end of the stuffing box gland and having a valve seat, a nozzle inserted through the bore in the plug through the stuffing box gland and screw seated therein, and having an inner end adapted to fit the valve seat, and packing around the nozzle in the packing chamber.

In testimony whereof, I have hereunto set my hand and seal at the city of Los Angeles, aforesaid, in the presence of two subscribing witnesses.

SAMUEL A. DENNIS. [L. S.]

Witnesses:
 ST. JOHN DAY,
 IDA M. DASKAM.